April 12, 1960  E. A. RUEGER  2,932,199
APPARATUS FOR MEASURING THE HUMIDITY OF GASES
Filed Sept. 7, 1954
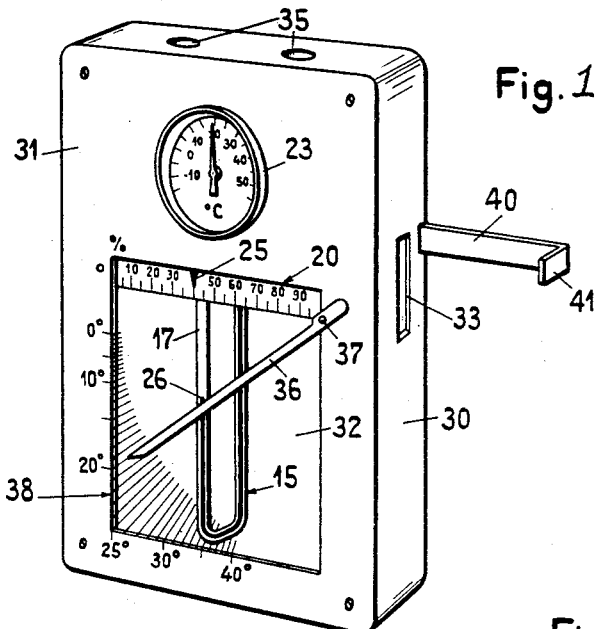
Fig. 1
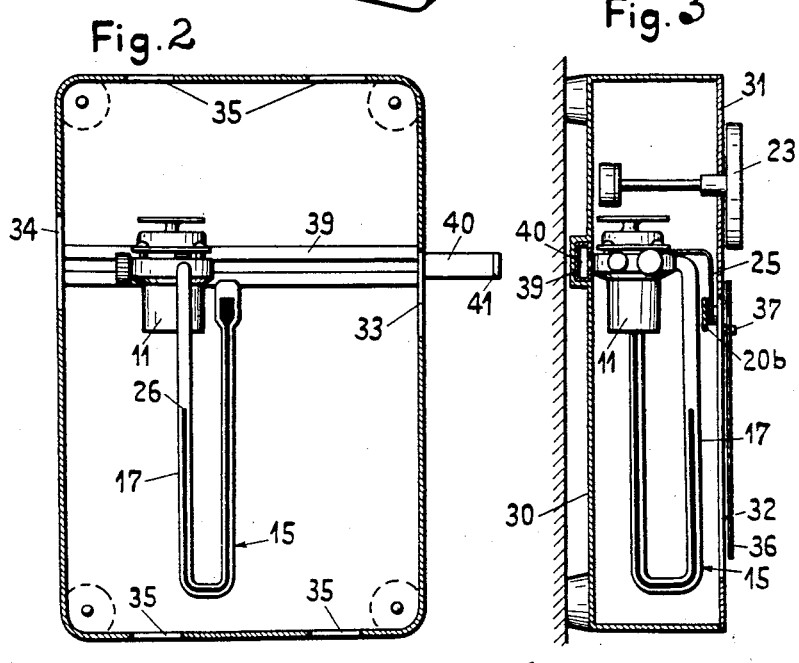
Fig. 2
Fig. 3
Inventor
E. A. Rueger
By Wenderoth, Lind & Ponack
Attys United States Patent Office 2,932,199
Patented Apr. 12, 1960

2,932,199
APPARATUS FOR MEASURING THE HUMIDITY OF GASES

Ernst August Rueger, Lausanne, Switzerland

Application September 7, 1954, Serial No. 454,407

Claims priority, application Switzerland
September 15, 1953

1 Claim. (Cl. 73—335)

For measuring the relative humidity of gases, i.e. the ratio of the amount of moisture in the gas to the amount which would saturate it at the prevailing temperature, apparatuses have become known which contain a vessel having a porous part of wall through which the gas can diffuse, together with a manometer for measuring the pressure difference arising between the inner space and the outer space of the vessel. It has been found that a definite relation exists between this pressure difference, the prevailing relative humidity and the temperature; in fact, with a given constant temperature the relative humidity decreases linearly with the pressure difference. If at any time two of the said magnitudes are known, the third can be determined under due consideration of the constant of the apparatus.

For this purpose, suitable nomographical tables were used heretofore which could be adopted exclusively for the particular instrument. Also an automatic recording instrument has become known, in which curves of the same relative humidity are plotted on a member in pivotal connection with a thermometer as a function of the temperature, the indicating point of the manometer moving within the range of said curves so that the relative humidity may be read direct at the indicating point of the manometer. The drawback of the last-mentioned instrument consists in that the reading entails some difficulties and cannot be particularly accurate. Further, the action of a thermometer, whose indicating member has also to operate another member, is uncertain and thus adversely affects the accuracy.

The present invention has for its object to obviate the aforementioned defects and relates to an apparatus intended for measuring the relative humidity of gases, being essentially characterized in that the indicating point of the manometer moves in the direction of one coordinate of a system of coordinates in the case of pressure alterations, whereby the indication of the manometer agrees with the scale of this coordinate; that the manometer and a carrier of the system of coordinates are adjustably located with respect to each other; that a scale calibrated in units of humidity and an associated reading mark for indicating the momentary setting of the manometer and of the carrier with respect to each other are provided on one or other of these elements; and that in the system of coordinates lines of the same temperature may be determined for the different temperature values, the indicating point of the manometer being within the range of said lines; the whole in such a way that for a given temperature the indicating point of the manometer may be adjusted to the corresponding temperature line by suitably setting the manometer with respect to the system of coordinates, whereby the humidity can be read direct on the corresponding scale.

The humidity scale may be graduated linearly, thus rendering the reading accurate and easy.

Further features of the invention will become apparent from the claim and the following description, taken in conjunction with the accompanying drawing.

Fig. 1 is a perspective view of a form of the invention, in which a rectangular system of coordinates is stationarily arranged, while the manometer is movable horizontally;

Fig. 2 shows the apparatus with the front wall cut away; and

Fig. 3 is a vertical section through the apparatus.

The apparatus as illustrated in Figs. 1 to 3 comprises a casing 30, the front wall of which is removable and consists of some transparent material, except the window 32 which is rendered opaque by a coat of paint or the like. Said casing 30 has several openings 33, 34 and 35 through which the air, or another gas surrounding the apparatus, is given access to the interior thereof. Above the window 32 a thermometer 23 is fixed on the front wall 31. The latter is carrier of a rectangular system of coordinates. A scale 20, extending horizontally and graduated with hundred units of the relative humidity, is again provided. The scale is located on a batten 20b fixed to the inside of wall 31 by the use of spacers. The rectilinear isothermals are represented, during operation of the instrument, by one edge of the pointer 36. This pointer is pivotally mounted on the outside of the front wall 31 by means of a pin 37 and can be adjusted by hand. Allocated to the pointer is a scale 38 calibrated in degrees of temperature and arranged on the transparent part 32 of the front wall 31. In this way greater convenience in reading is obtained, a separate set of isothermals being avoided.

Arranged on the back wall of said casing 30 is a horizontal guide rail 39, along which a bar 40 can be moved. One end of said bar projects out of the casing 30 and has an offset portion 41 serving as handle when moving the bar. Secured at the other end of said bar 40 is the diffusion vessel 11 having a U-shaped liquid manometer 15 connected therewith. The vertically directed measuring tube 17 of said manometer is in connection with the interior of the vessel 11, while the other limb of the manometer is under the influence of the atmosphere. The measuring tube 17 extends behind the window 32 at a comparatively little distance therefrom, and the pointer of the manometer corresponds to the ordinate of the said coordinate system. Secured on the vessel 11 is a pointer 25 (not shown in Fig. 2) adapted to move along the scale 20 as reading mark when the manometer 15 is moved sideways by means of the bar 40.

To ascertain the momentary relative humidity of the air, or any other gas surrounding the apparatus, the temperature is first read on the thermometer 23 and then the tip of the pointer 36 will be set on the scale 38 to the value of the read temperature. The upper edge of the pointer 36 then represents an isothermal in the aforementioned system of coordinates. Thereupon, by means of handle 41, the manometer 15 will be moved in such a way that its reading point 26 coincides with the upper edge of the pointer 36 when viewed at right angles to the front wall 31. Finally all that is necessary is to read the relative humidity on the scale 20b opposite the pointer 25.

It is only the manometer with the diffusion vessel that can be moved, while the coordinate system is immovably located.

Still another alternative form might be conceivable in which the pointer—which represents the straight lines of identical temperature and is adjustable to the reading point of the stationary manometer—carries the scale calibrated in units of humidity. Thereby the fulcrum of the pointer and humidity scale is movable along a temperature scale. With the fulcrum of the pointer set to the temperature and upon its adjustment to the pressure level of the manometer, the humidity may thus be read on the humidity scale at the reading mark capable of being displaced with the fulcrum but stationary relative to the swivable humidity scale.

As compared with the automatically registering instruments referred to at the beginning, the aforedescribed apparatuses involve indeed the drawback that manual adjustment is necessary though being practically of little importance inasmuch as, in most cases, the momentary value of the temperature has to be known and should be read on a thermometer. On the other hand there is the merit of greater accuracy in measuring and reading, easier supervision, better possibility of checking, and lower cost of manufacture.

What I claim is:

Apparatus for measuring the humidity of gases, comprising a closed receptacle having a porous wall portion through which a gas can diffuse, a thermometer for indicating the temperature of said gas, a manometer of vertical column form for determining the pressure difference between the inside of said receptacle and said gas, a carrier, a first scale arranged horizontally on said carrier and being linearly subdivided into units of relative humidity, a pointer mounted on said manometer cooperating with said first scale, an indicator having a straight edge pivotally arranged on said carrier, a second scale on said carrier cooperating with said indicator and being subdivided into temperature units, said indicator being manually adjustable relative to said second scale in accordance with the reading of said thermometer, said manometer and said carrier being arranged for movement relatively in horizontal direction in order to bring the top of said manometer column in coincidence with said edge of said indicator, whereupon the relative humidity of said gas is readable on said first scale opposite said pointer.

References Cited in the file of this patent

UNITED STATES PATENTS

| | | |
|---|---|---|
| 2,143,775 | Hertel | Jan. 10, 1939 |
| 2,651,201 | De Mestrol | Sept. 8, 1953 |

FOREIGN PATENTS

| | | |
|---|---|---|
| 281,169 | Switzerland | June 3, 1952 |
| 295,416 | Switzerland | Dec. 31, 1953 |